(12) United States Patent
Lazarov

(10) Patent No.: US 11,958,523 B1
(45) Date of Patent: Apr. 16, 2024

(54) HAND TRUCK DOLLY TOOL SYSTEM

(71) Applicant: Ross Lazarov, Prior Lake, MN (US)

(72) Inventor: Ross Lazarov, Prior Lake, MN (US)

( * ) Notice: Subject to any disclaimer, the term of this patent is extended or adjusted under 35 U.S.C. 154(b) by 285 days.

(21) Appl. No.: 17/583,843

(22) Filed: Jan. 25, 2022

(51) Int. Cl.
*B62B 5/00* (2006.01)
*B25G 1/10* (2006.01)
*B62B 1/10* (2006.01)

(52) U.S. Cl.
CPC ............... *B62B 5/00* (2013.01); *B25G 1/102* (2013.01); *B62B 1/10* (2013.01)

(58) Field of Classification Search
CPC .... B62B 5/00; B62B 1/10; B62B 1/12; B62B 1/14; B62B 1/142; B62B 1/145; B62B 1/147; B25G 1/102
See application file for complete search history.

(56) References Cited

U.S. PATENT DOCUMENTS

| | | | | |
|---|---|---|---|---|
| 1,517,951 | A * | 12/1924 | Cade | B62B 1/14 |
| | | | | 280/47.27 |
| 4,893,824 | A * | 1/1990 | Turek | B62B 1/14 |
| | | | | 414/490 |
| 6,540,242 | B1 * | 4/2003 | Raichlen | B62B 1/12 |
| | | | | 280/47.35 |
| 7,905,502 | B2 * | 3/2011 | Oliver | B25H 3/00 |
| | | | | 280/47.28 |
| 8,939,453 | B1 * | 1/2015 | Ficociello | B62B 1/147 |
| | | | | 280/47.26 |
| 2016/0325770 | A1 * | 11/2016 | Wilcox | B62B 5/0003 |
| 2021/0070337 | A1 * | 3/2021 | Bowen, III | B62B 1/125 |
| 2021/0123432 | A1 * | 4/2021 | Youngblutt | B62B 1/26 |

* cited by examiner

*Primary Examiner* — John D Walters
(74) *Attorney, Agent, or Firm* — Dietz Law Office LLC

(57) ABSTRACT

A hand truck dolly tool that may be utilized to hold, maneuver, and move objects onto and off of a hand truck. The hand truck tool of the invention includes a long handle and hook that cooperate together to engage an object to allow a user to push, pull or pry the object relative to the hand truck without the need to bend over. The tool is particularly useful for loading and unloading packages onto the hand truck.

12 Claims, 16 Drawing Sheets

HAND TRUCK DOLLY TOOL SYSTEM

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention pertains generally to tools and methods for loading and unloading parcels and moving parcels from one location to another. The invention minimizes the amount a user must bend the back in order to grip or hold a package while it is loaded or unloaded relative to the hand truck dolly. More specifically, this invention pertains to a multi-purpose tool that is mounted onto a hand truck dolly and that is particularly useful for engaging an edge of a parcel to either pull or push a parcel onto a hand truck dolly and subsequently push, pull or pry the parcel off the hand truck dolly. Further, the present invention may be utilized to apply a pulling force on the axle of the hand truck dolly without requiring a bending motion of the user.

BACKGROUND

Over the years many hand trucks or dolly systems have been devised to move and transport one or more parcels from one location to another. The dolly reduces the need for a user to strain back muscles while carrying or moving the parcel. However, oftentimes a user will use back muscles to load parcels onto the hand truck, remove parcels from the hand truck, maneuver the hand truck or adjust parcels relative to the hand truck. Although a user may improvise with other apparatus, the present invention quickly couples and detaches from hand trucks thereby making the tool accessible when the need is least expected.

Further, the present invention provides an apparatus that one person may utilize to maneuver a package relative to a hand truck without the need to bend the user's back. The present invention is particularly useful for engaging an edge of a parcel to either pull or push the parcel onto the nose plate of a hand truck dolly and subsequently push, pull or pry the parcel off the nose plate. Further, the present invention may be utilized to apply a pulling force on the axle of the hand truck dolly to pull the nose plate out from underneath a parcel without requiring a bending motion of the user.

SUMMARY

Embodiments according to aspects of the invention provide an accessory or tool of a hand truck dolly that facilitates the positioning and moving of a parcel. The tool is compact and lightweight yet rigid and robust to maneuver heavy parcels without bending and breaking. Without limitations intended the handle may be constructed from an aircraft grade aluminum, titanium or other material of known suitable construction to provide these enhanced features.

In accordance with aspects of the invention, an embodiment of the invention includes a tool having a handle and pegs. The handle has a first end that includes a gripping surface formed adjacent the first end. The handle further has a second end that includes bevels formed along edge segments of the second end. The pegs extend from opposing sides of the second end of the handle adjacent to the bevels formed in the second end of the handle.

In accordance with aspects of the invention, the hand truck tool system may further include a clip that engages around the handle and is attachable to a frame of the hand truck. Additionally, the hand truck system may include a socket retention member adapted for receiving the pegs and second end of the handle. The socket retention member is attachable to a lower frame portion of the hand truck dolly. When the pegs are engaged within the socket the tool is held in place as the hand truck is placed upright or on its side. Without limitation intended, in a preferred embodiment of the invention the length of the handle is at least two feet.

In accordance with aspects of the invention, an embodiment of the invention includes a hand truck dolly system, wherein the system incudes a hand truck, a tool, a clip and a socket retention member. The hand truck has an upright frame, wheels attached to the frame and a platform or nose plate extending outward from a bottom portion of the frame. The tool has a handle having a first end that includes a gripping surface formed adjacent the first end and having a second end that includes bevels formed along edge segments of the second end. Pegs extend from opposing sides of the handle of the tool adjacent the bevels and second end of the handle. The clip engages around the handle and is attachable to a frame of the hand truck dolly. The socket retention member is adaptable for receiving the pegs and second end of the handle. Further, the socket retention member is attachable to a lower frame portion of the hand truck dolly and retains the tool in a fixed position relative to the hand truck frame.

When using the hand truck system a user may attach the clip and socket retention member to the frame of the hand truck. The tool may be coupled and uncoupled from the hand truck by pulling the beveled tip and pegs out of the socket retention member and rotating the handle out of the clip. Once the user has selected a parcel to move the user obtains the hand truck system of the invention that includes a hand truck dolly having a frame, wheels attached to the frame and a platform extending outward from a portion of the frame; a tool having a handle, wherein the handle has a first end that includes a gripping surface formed adjacent the first end and having a second end that includes bevels formed along edge segments of the second end; pegs extending from opposing sides of the handle of the tool, wherein the pegs extend adjacent the second end of the handle; a clip that engages around the handle and is attachable to the frame of the hand truck dolly; and a socket retention member adapted for receiving the pegs and second end of the handle and wherein the socket retention member is further attachable to the frame. With the hand truck system in hand the user may engage or disengage the tool from the hand truck dolly. The parcel is manipulated onto and off of the hand truck with the use of the tool. The user may use the second end of the tool to move the parcel onto or off of the platform of the hand truck dolly.

The user may further secure the parcel on the hand truck by engaging the parcel with the tool as the hand truck is moved. When the user wants to load the parcel onto the hand truck the user engages the parcel with the peg of the tool to enable a user to pull the parcel towards the frame of the hand truck dolly. When unloading the parcel the peg may be engaged against a rear end of the parcel to enable a user to push the parcel away from the frame of the hand truck dolly. The user may use the beveled end of the tool to pry the parcel away from the frame of the hand truck dolly. Further the peg may be used to engage an axle of the hand truck dolly to enable a user to pull the hand truck dolly away from the parcel.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
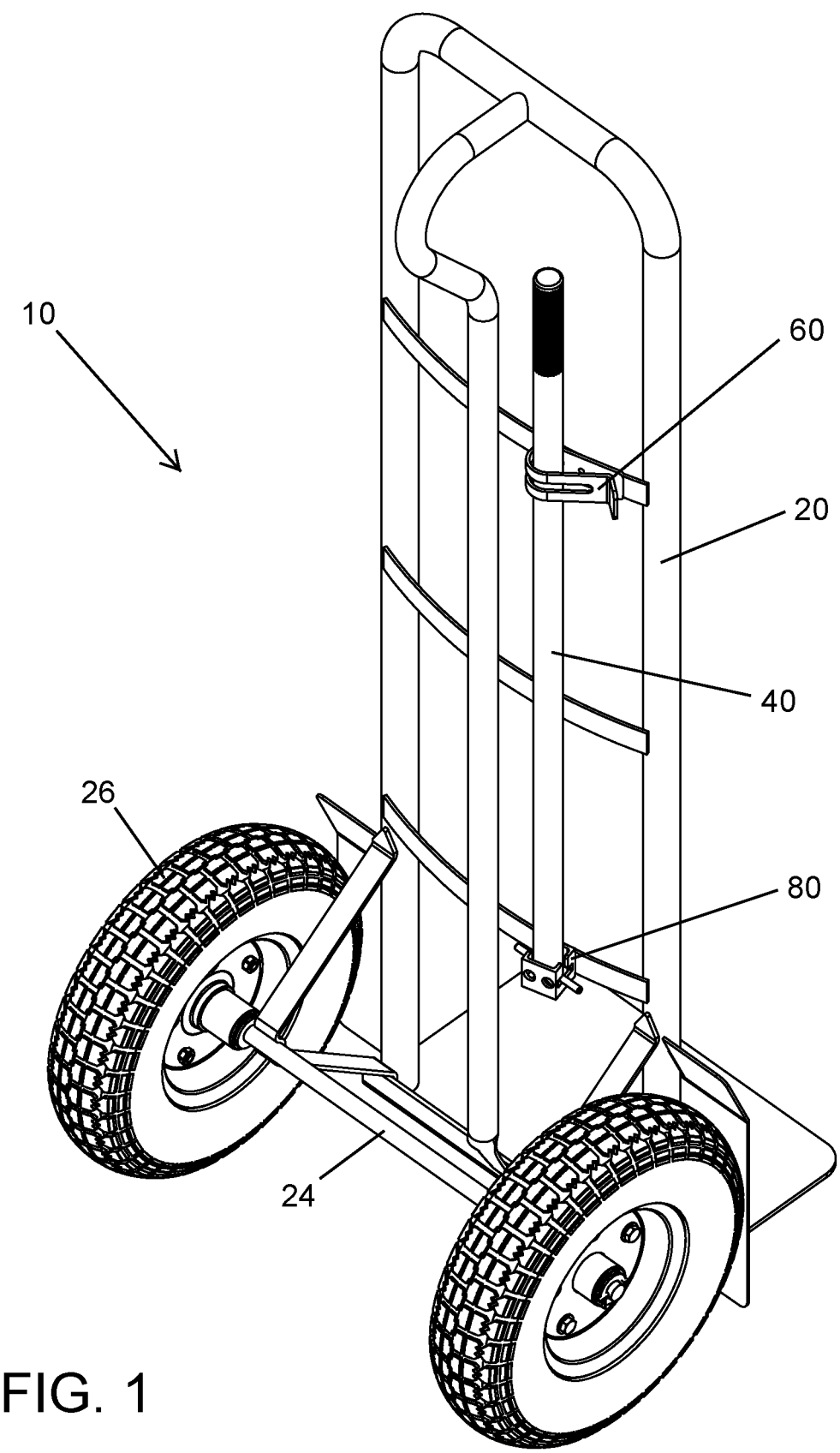
FIG. 1 is a back perspective view of a hand truck dolly system in accordance with an embodiment of the invention.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

With reference to the Figures, the hand truck tool system 10 is described in greater detail. The hand truck tool system 10 of the present invention generally includes hand truck 20, tool 40, clip 60 and socket retention member 80. The hand truck 20 includes a frame 22 with an axle 24 fixed to a lower portion of the frame 20. Wheels 26 are rotatably mounted to the axle. A nose plate or parcel platform 28 extends outward from a lower portion of the frame 22 of the hand truck 20. Parcels 14 may be positioned on the platform 28 and against the frame 22 so that a user may tip the hand truck backwards and wheel the parcels to a different location. A grip end of the tool is contained within clip 60 and the second beveled end and pegs are contained with the socket retention member 80. The tool is between approximately two and three feet and the pegs extend between one half inch to an inch from the side of the tool. Those skilled in the art will appreciate that other materials and dimension may be incorporated without departing from the scope of the invention. The hand truck 20 illustrated in the figures is particularly well suited for the hand truck dolly tool system 10 however those skilled in the art will recognize that there are many other hand truck designs that are equally well suited for the system 10.

Figure 2:
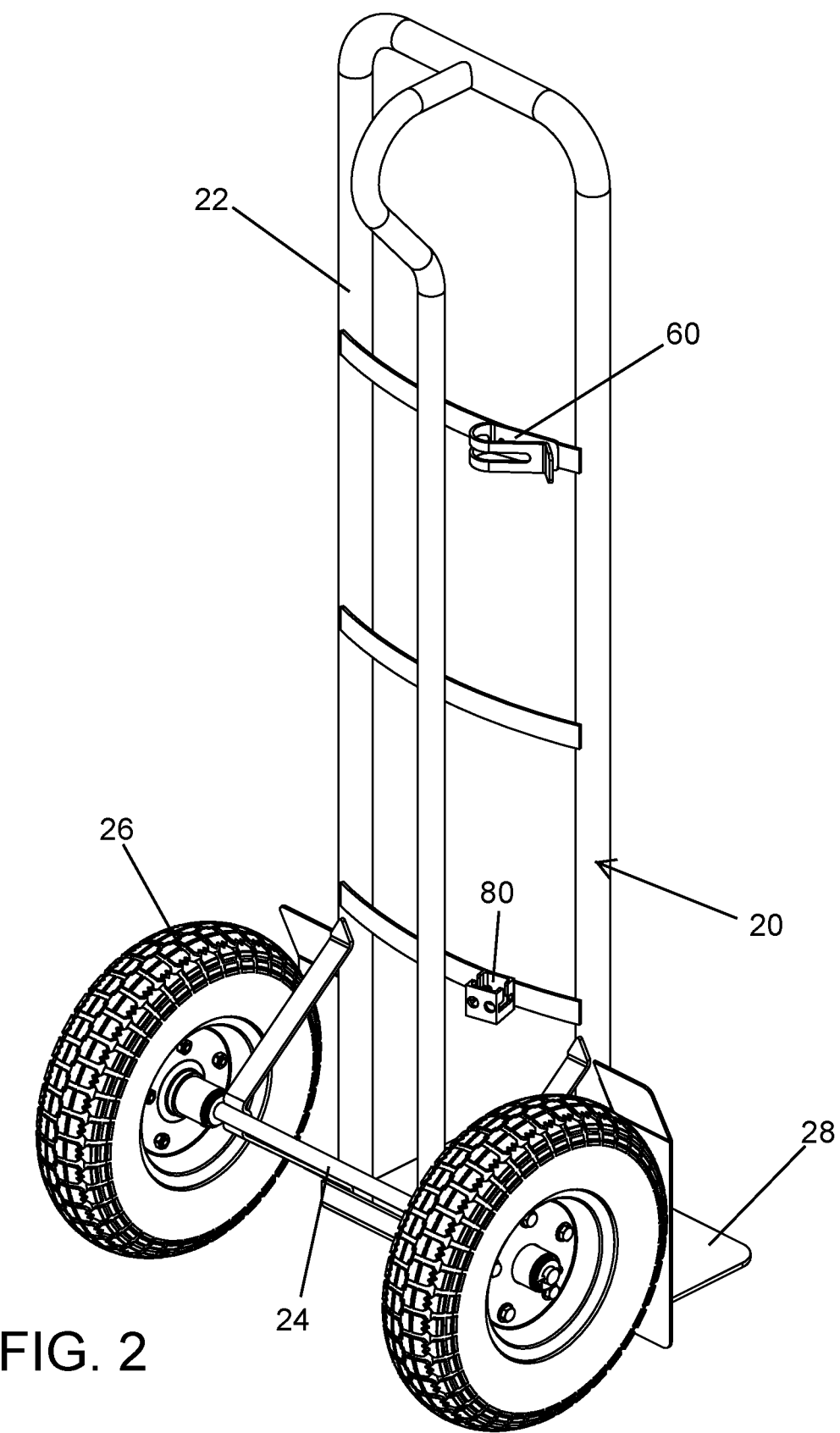
FIG. 2 is a back perspective view of a hand truck dolly system in accordance with an embodiment of the invention showing the tool removed from the dolly.
Figure 3:
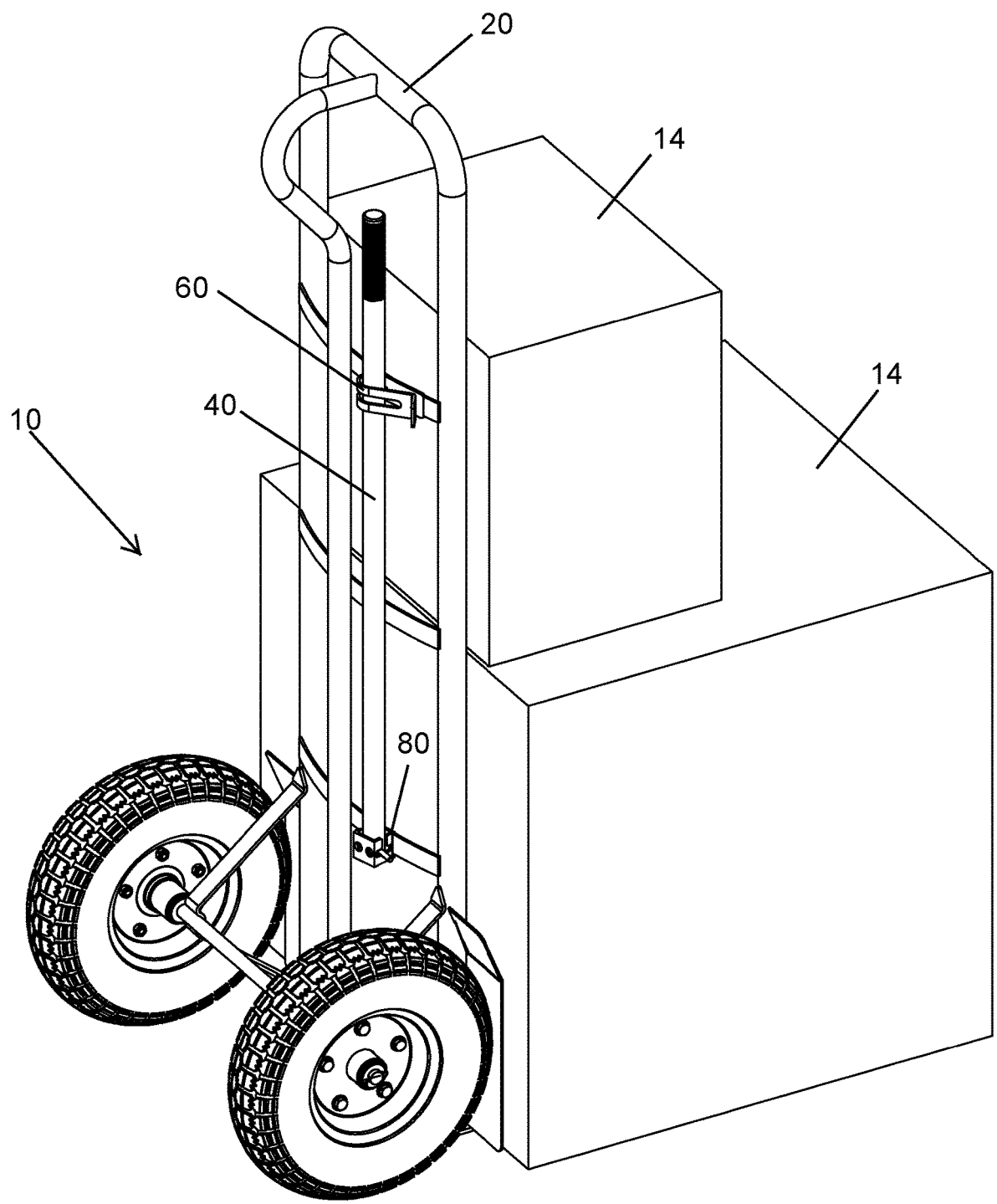
FIG. 3 is a back perspective view of a hand truck dolly system in accordance with an embodiment of the invention illustrating parcels loaded on the nose plate of the dolly.

FIGS. 1-2 illustrates embodiments of the hand truck dolly tool system 10. Hand truck 20 includes a nose plate 28 extending outward from frame 22 of the hand truck. The nose plate 28 is adapted for receiving parcels 14 thereon. Tool includes a cylindrical handle 42 having a first end 44 and second end 50. The 40 first end 44 has a knurled grip 46 formed into an outer surface of the cylindrical handle 42. The second end 50 terminates in a beveled segments 52 formed along edge portions of the second end 50. Pegs 54 extend outward from the handle 42 adjacent the bevel 52 and second end 50. Clip 60 is fixed to an upper portion of frame 22 of the hand truck 20. The socket retention member 80 is fixed to a lower portion of the frame 22 of the hand truck 20 and is axially aligned with clip 60. Tool 40 is held in place in a fixed position relative to frame 22 by the clip 60 and socket retention member 80. A user may free the tool 40 from the hand truck 20 by lengthwise rotating the first end portion 44 of the handle 42 out of the open end 64 of the clip 60. Before rotating lengthwise, the user may need to align the pegs 53 with the peg slots 84 of the socket retention member 80. Once the first end 44 is removed from the clip 60 the second end 50 of the tool 40 may be pulled out of the socket retention member 80.

Figure 4:
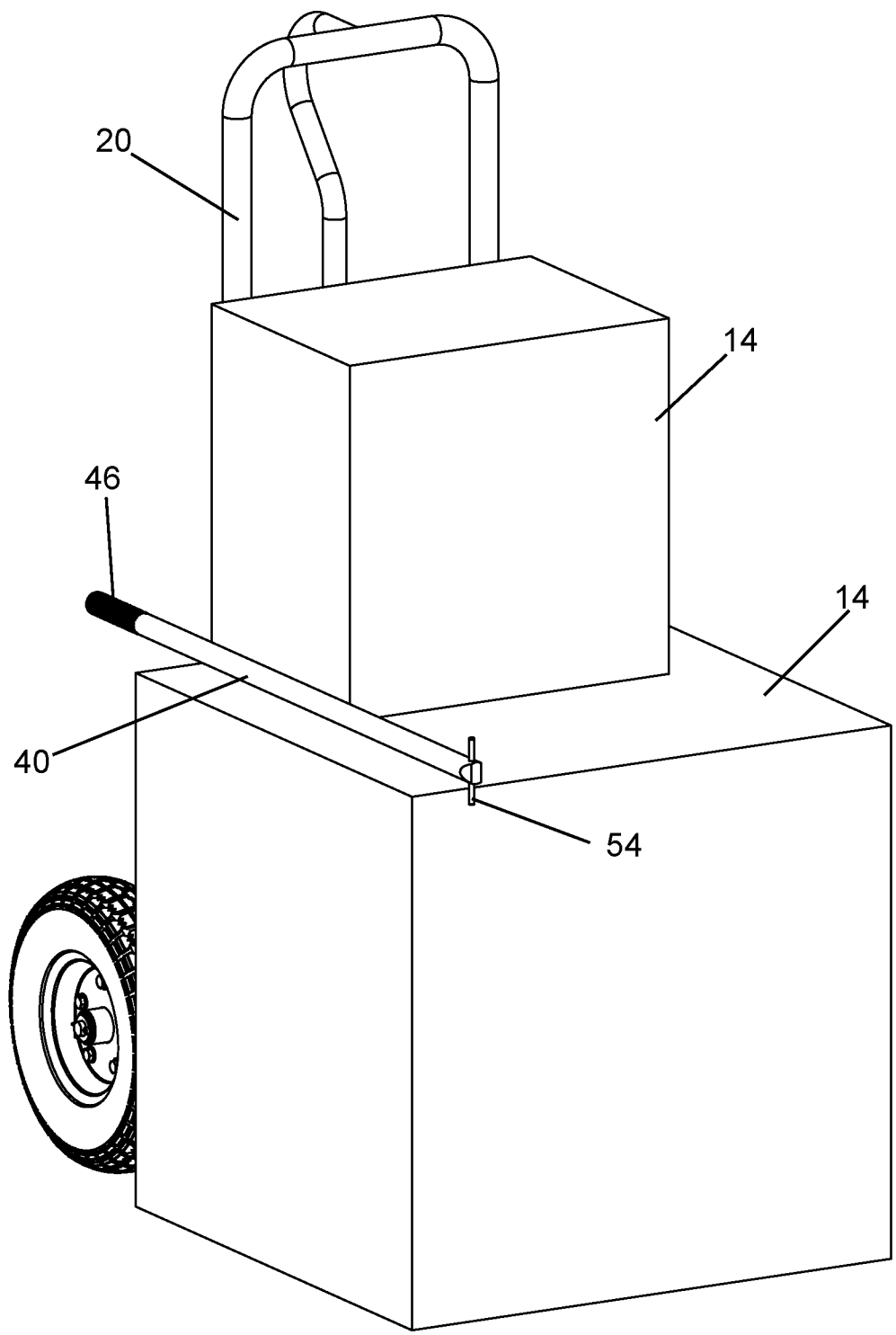
FIG. 4 a front perspective view of a hand truck dolly system in accordance with an embodiment of the invention illustrating the tool pulling parcels onto the nose plate of the dolly from a top of the parcel.
Figure 5:
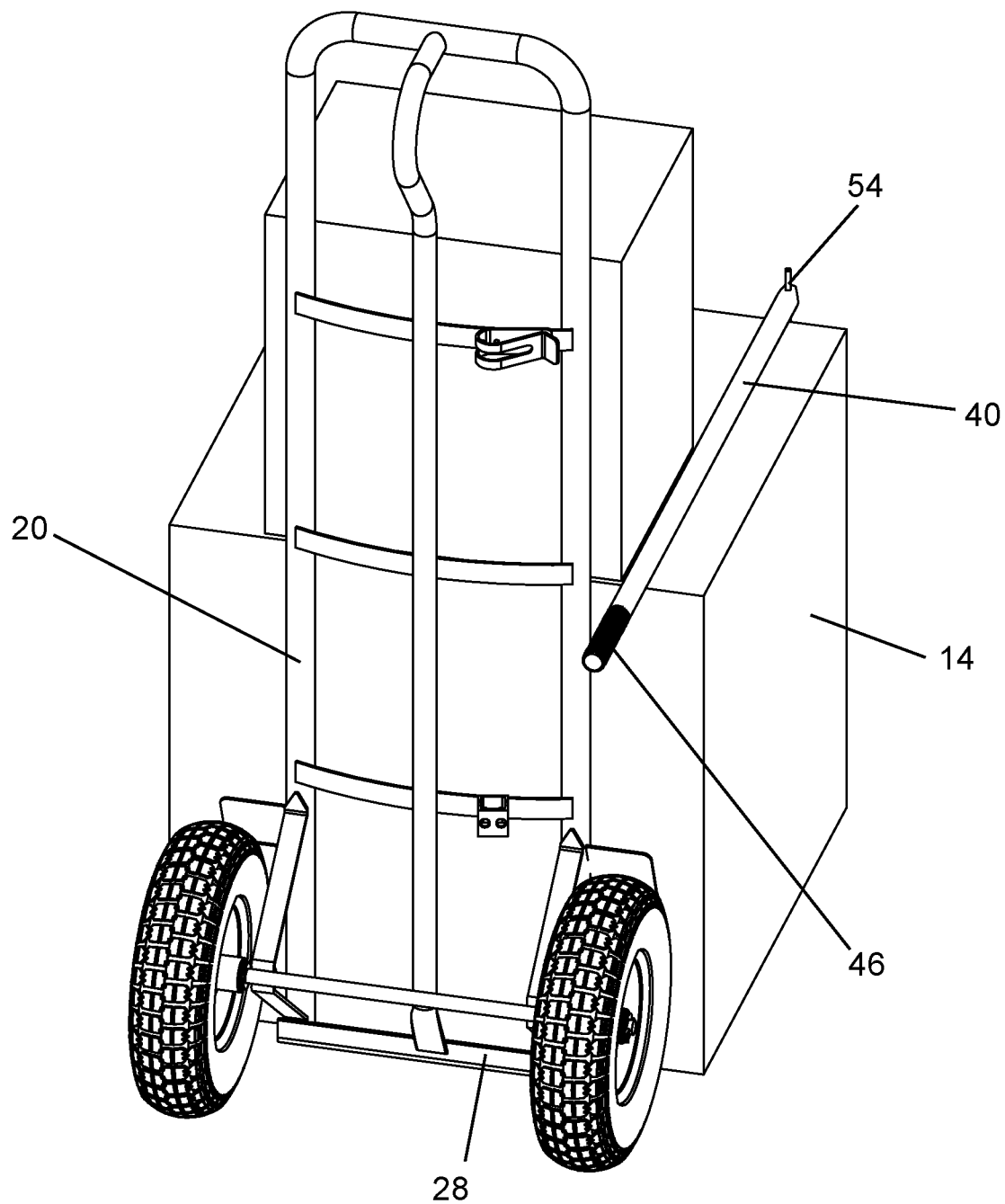
FIG. 5 is a back perspective view of a hand truck dolly system in accordance with an embodiment of the invention illustrating the tool pulling parcels onto the nose plate of the dolly.
Figure 6:
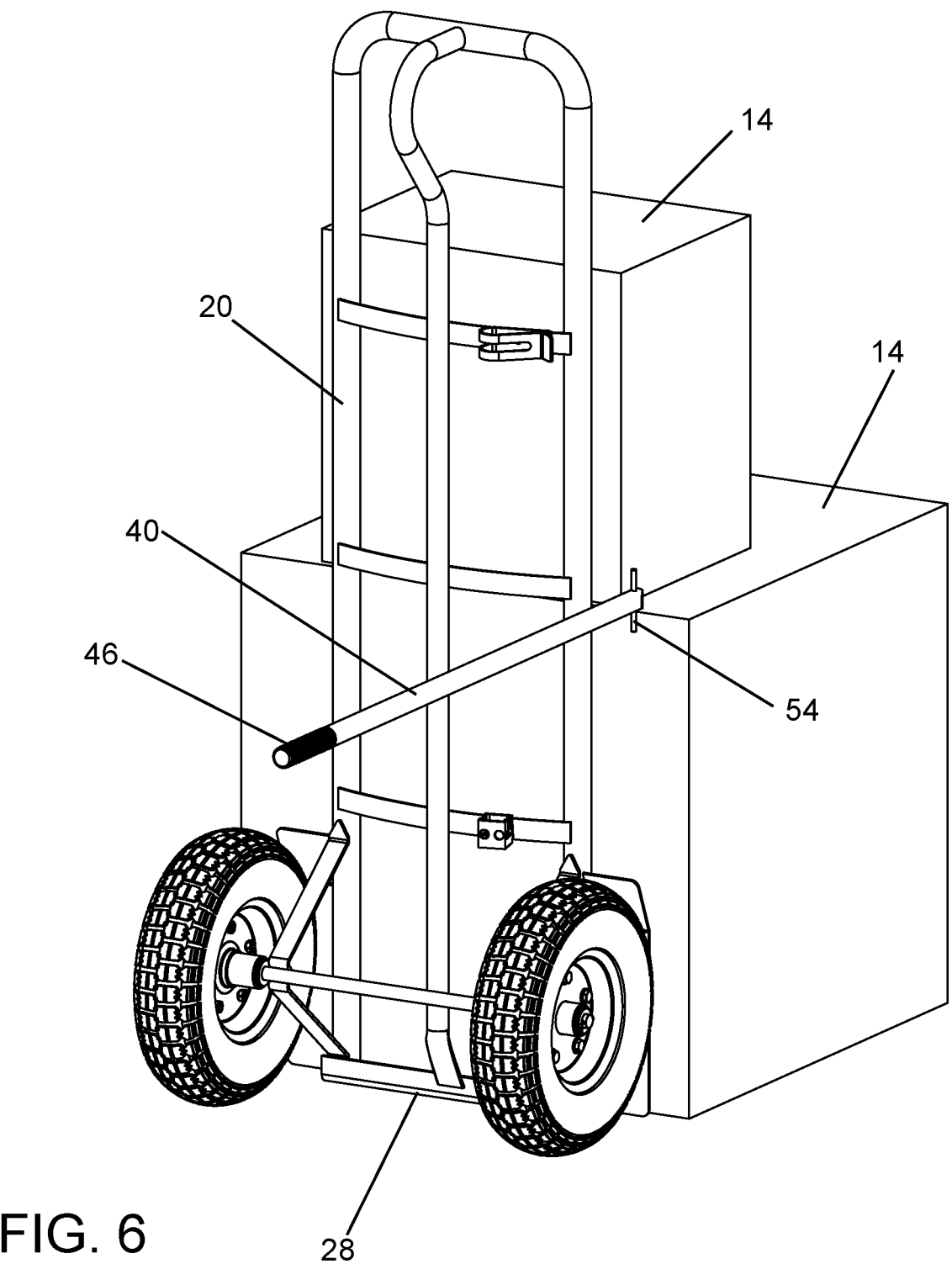
FIG. 6 is a back perspective view of a hand truck dolly system in accordance with an embodiment of the invention illustrating the tool pulling parcels onto the nose plate of the dolly from a side of the parcel.
Figure 7:
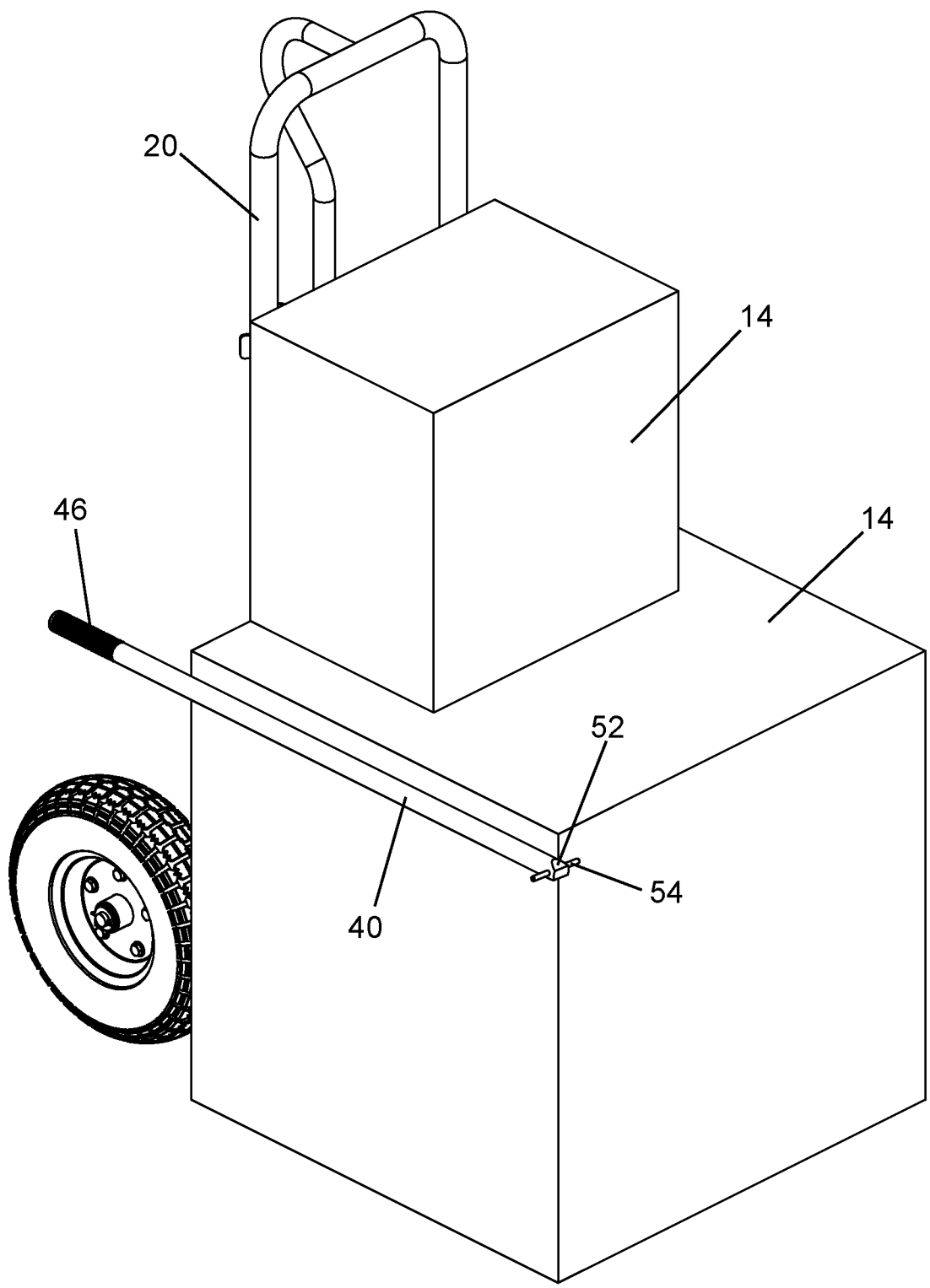
FIG. 7 is a back perspective view of a hand truck dolly system in accordance with an embodiment of the invention illustrating the tool pulling parcels onto the nose plate of the dolly.

With reference to FIGS. 3-7 it may be desirable to load or unload parcels 14 onto and off of the nose plate 28 of the hand truck 20 using tool 40. User engages peg 54 with a top edge of the parcel 14. The handle may be either pulled (as illustrated in FIGS. 4-5) or pushed to move the parcels in a desired direction. FIG. 6 illustrates the orientation of the tool 40 relative to the parcel 14 to allow the user to push the parcel in a desired direction (off of the nose plate 28 in this instance). Further, as illustrated in FIG. 7, the peg 54 may engage a forward side edge of the parcel 14 to allow the user to pull the parcel 14 towards the hand truck 20.

Figure 8:
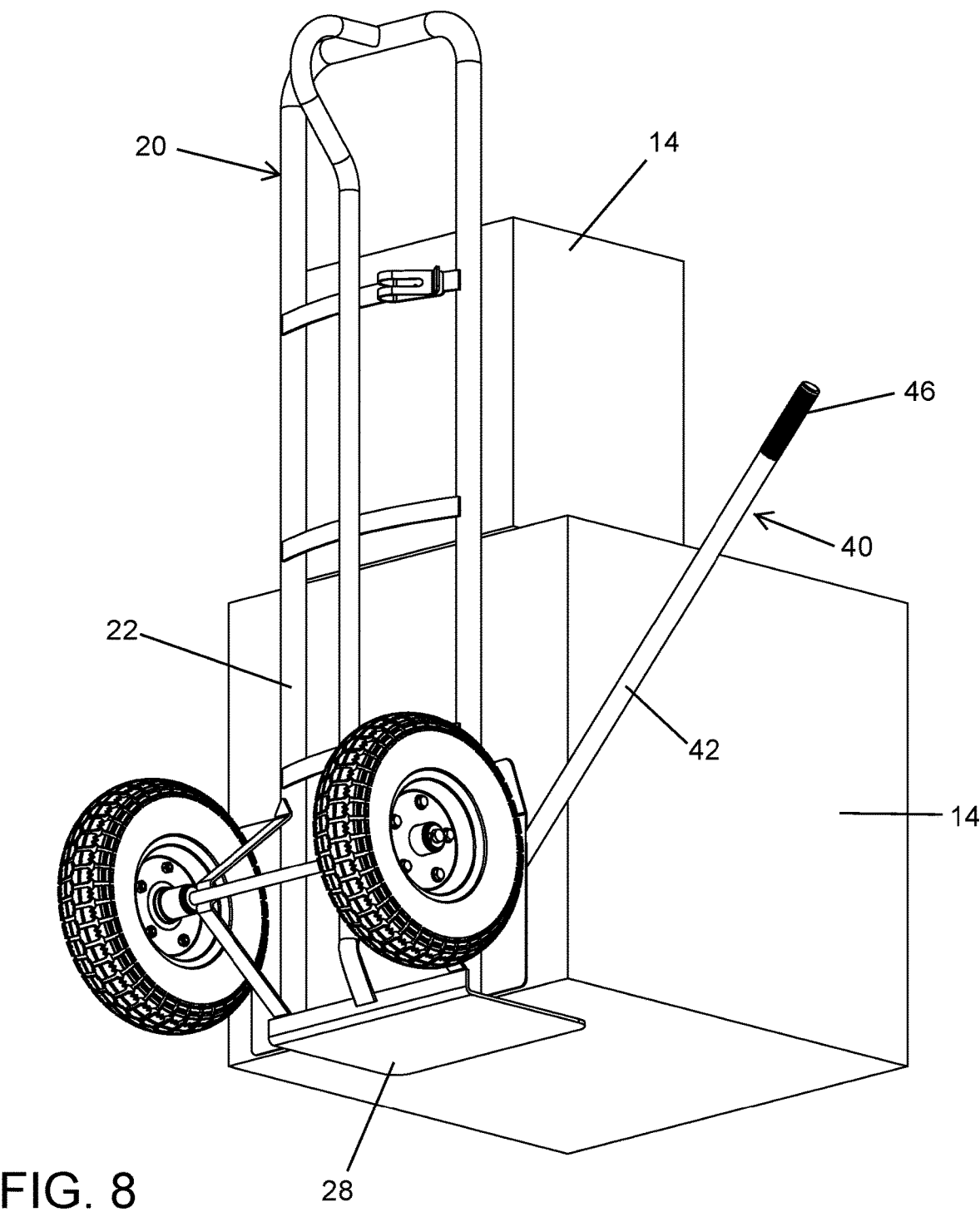
FIG. 8 is a back perspective view of a hand truck dolly system in accordance with an embodiment of the invention illustrating the tool prying parcels away from a backer plate and off the nose plate of the dolly.
Figure 9:
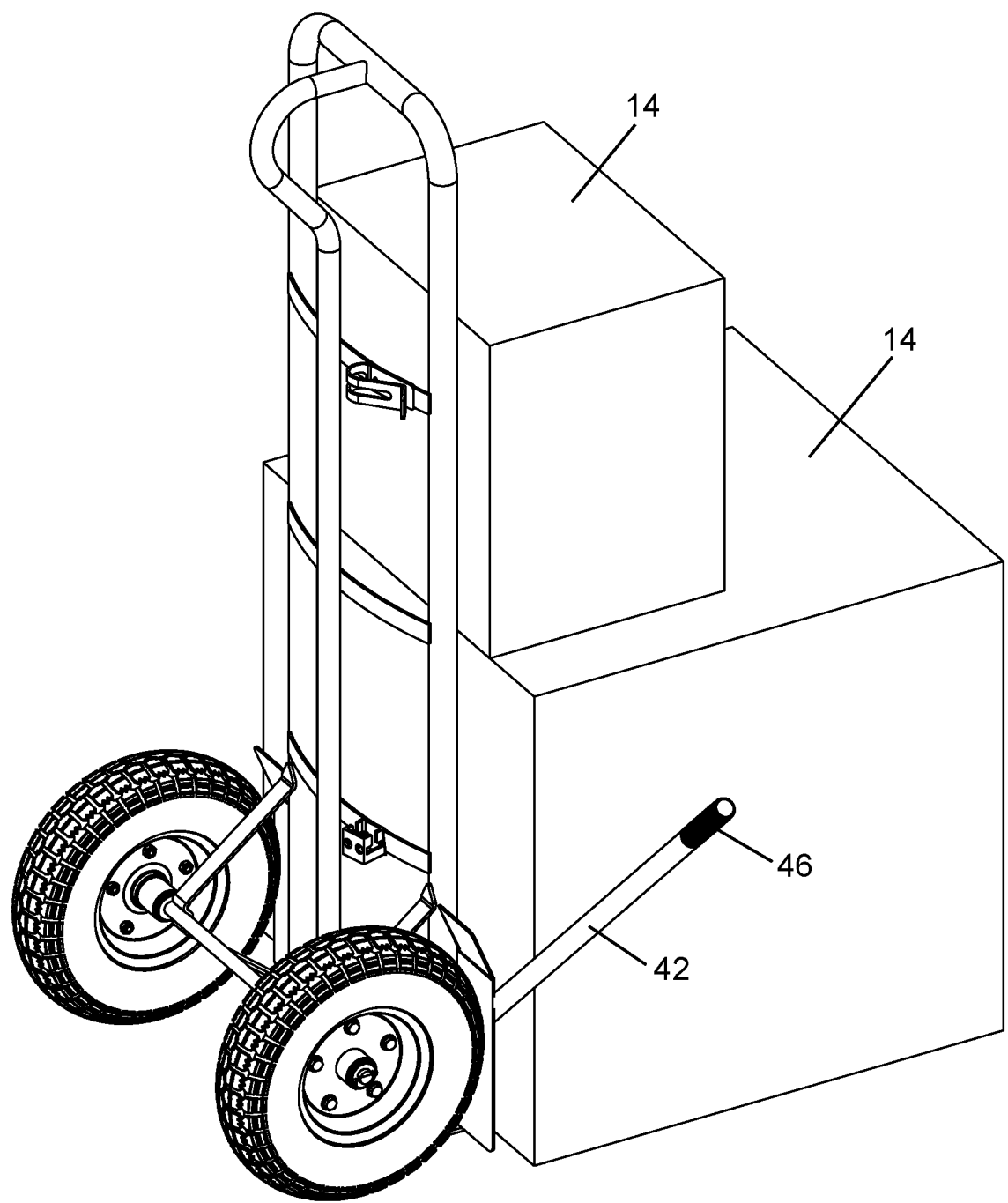
FIG. 9 is a back perspective view of a hand truck dolly system in accordance with an embodiment of the invention illustrating the tool prying parcels away from a backer plate and off the nose plate of the dolly.
Figure 10:
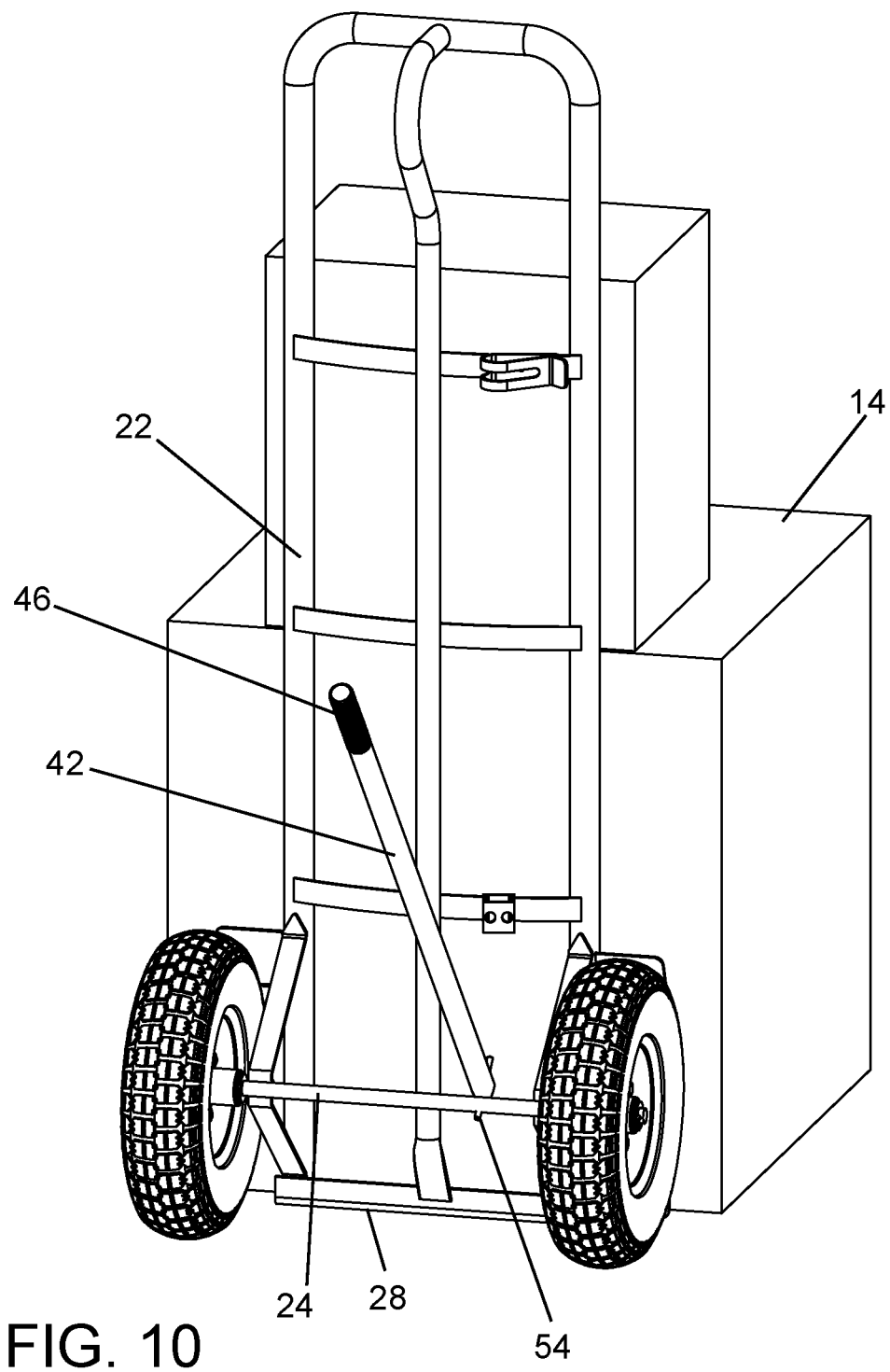
FIG. 10 is a back perspective view of a hand truck dolly system in accordance with an embodiment of the invention illustrating the tool pulling n the axle of the dolly to pull the nose plate from under the parcels.

FIGS. 8 and 9 illustrate the bevel 52 pressed between the parcel 14 and backer of the nose plate 28 to allow the ese to use the handle 42 to leverage and pry the parcel off of the hand truck 20. The user holds the handle 42 at the grip 46 and applies a force either forward or backward to translate a force at the beveled end of the tool 40 and thereby pry the parcel. The handle length is chosen such that a user may grip the handle without the need to bend the back to reach the grip 46 of the handle 42. The user may instead choose to use the tool 40 to pull on the axle 24 of the hand truck 20. Peg 54 engages the axle 24 thereby allowing the user to apply a pulling force against the hand truck 20. When a pulling force is applied, the wheels 26 rotate and the nose plate 28 is pulled out from underneath the parcel 14; see FIG. 10.

Figure 11:
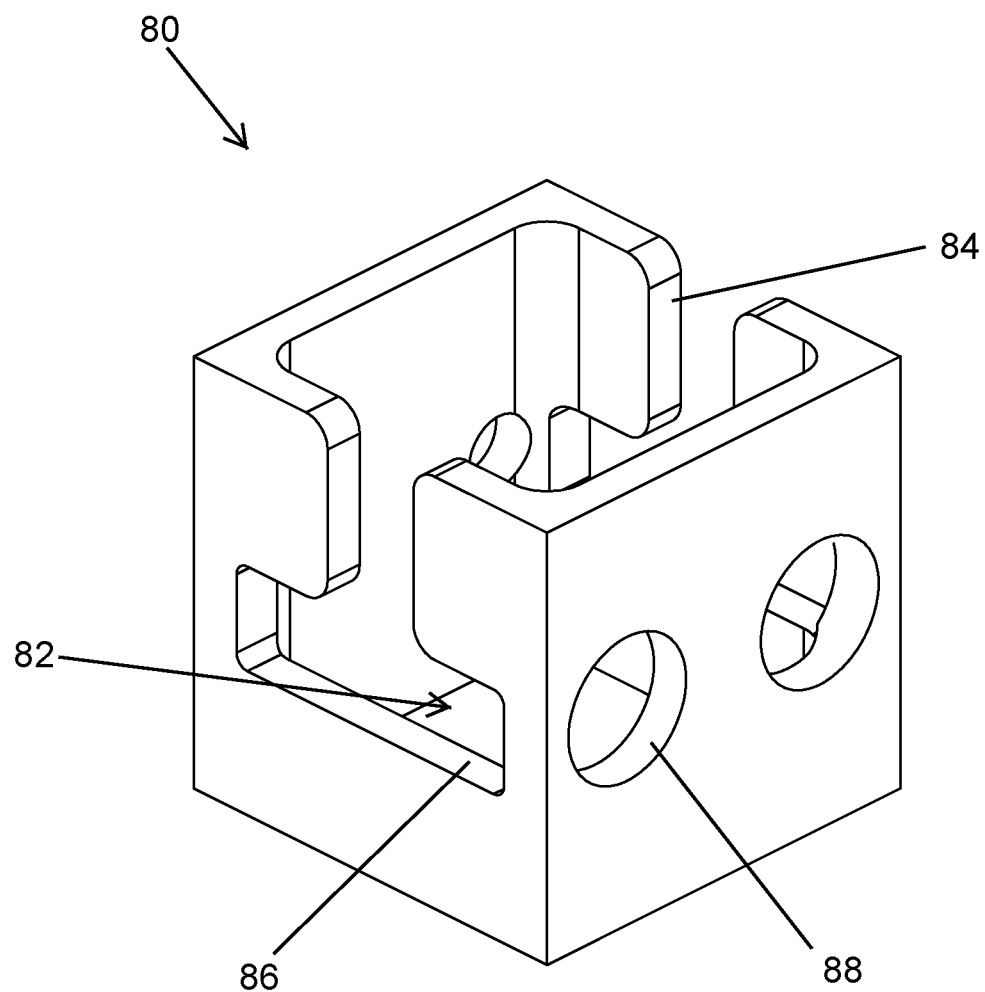
FIG. 11 is a front top left perspective view of the socket retention member in accordance with an embodiment of the invention.
Figure 12:
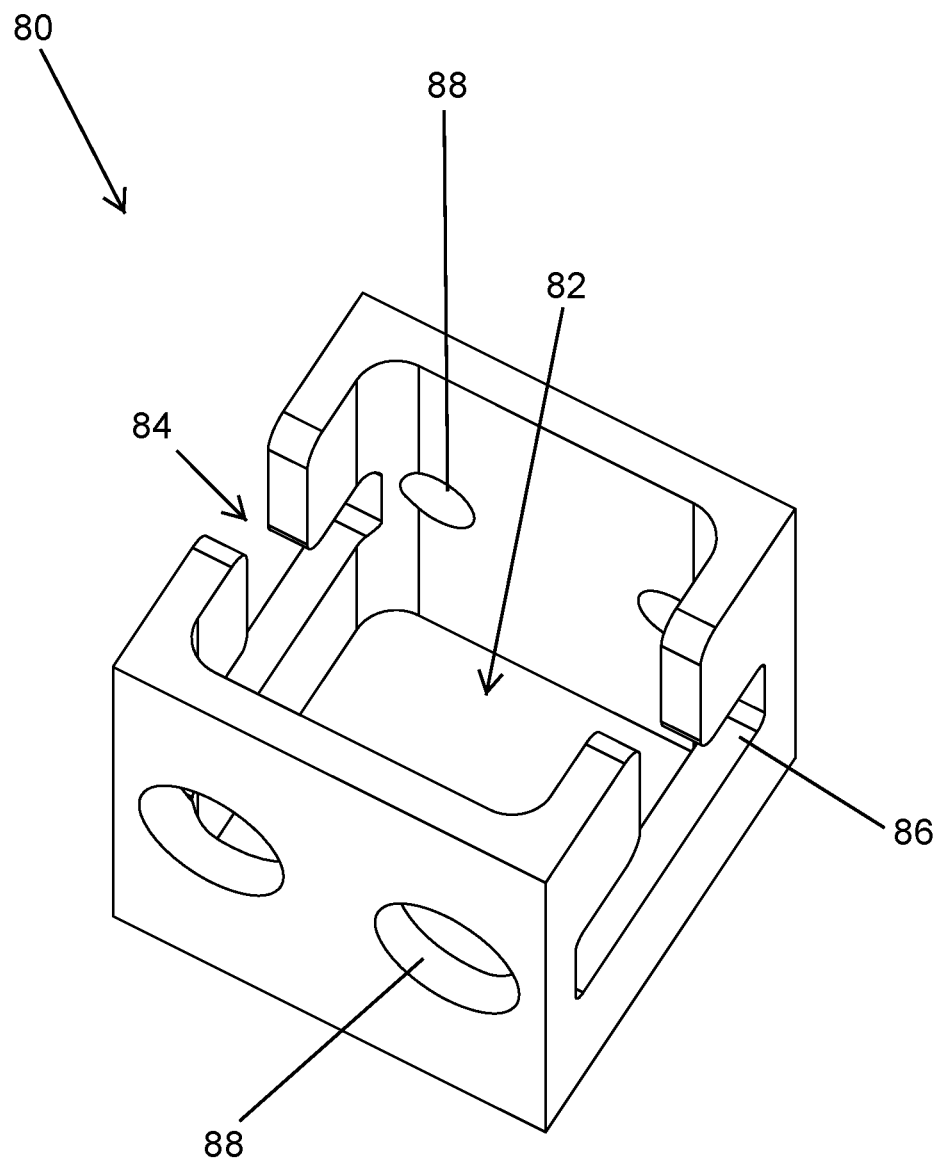
FIG. 12 is a front top right perspective view of the socket retention member in accordance with an embodiment of the invention.

With reference to FIGS. 11 and 12 the socket retention member 80 is illustrated. Retention member 80 includes a cavity 82 formed in the member that is sized and adapted to receive the second end 50 of the tool 40. As the end of the tool 40 is inserted into the cavity, pegs 54 of the tool slide through peg slots 84. As the tool continues to drop into the retention member 80, the pegs 54 engage a bottom of retaining slots 86. The user may then twist the handle 42 to move the pegs into engagement within the retaining slots 86. Mounting holes 88 may be utilized to fasten the retaining member 80 to the frame 22 of the hand truck 20 with screws or other mounting hardware (not shown).

Figure 13:
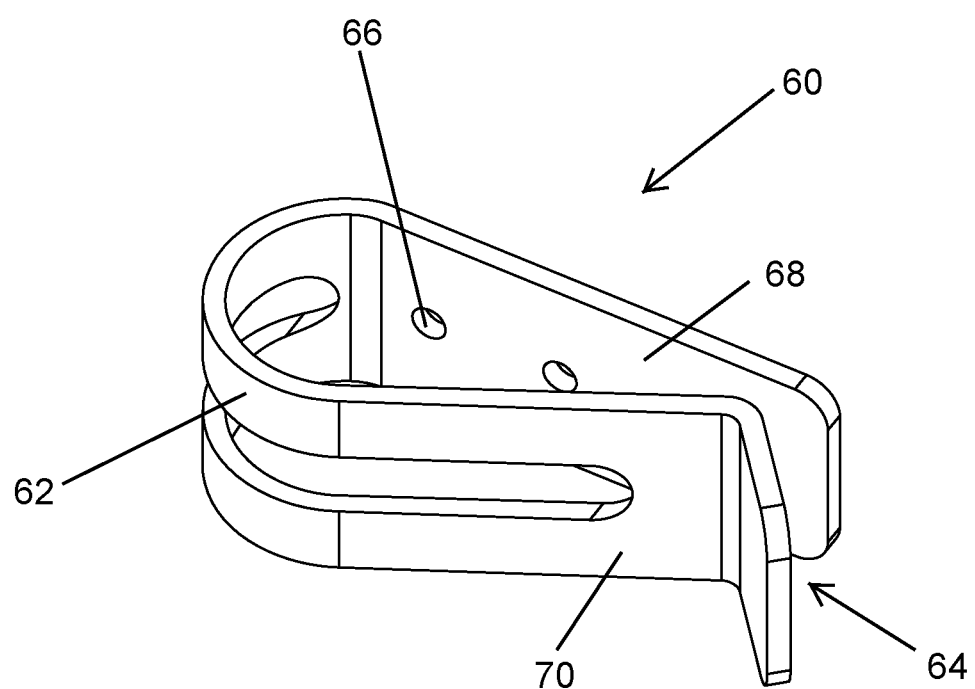
FIG. 13 is a perspective view of the clip in accordance with an embodiment of the invention.

Clip 60 is further illustrated in FIG. 13. The clip 60 is preferably made from a flexible springy material. The clip includes a back portion or mounting portion 68 that has mounting holes 66 extending therethrough to allow the user to mount the clip to the frame 22 of the hand truck 20. The clip 60 further includes a bent portion or curve 62 and a retaining portion 70. When mounted to the hand truck the curved portion 62 allows the user to move the free end of the clip outward and away from the hand truck, thereby enlarging the open end 64 and allowing the user to insert the handle 42 into the open end. When the free end of the clip is released, the resilience of the clip returns the retaining portion or free end portion 70 of the clip back to its at rest position. The relative diameter of the curved portion 62 is sized slightly larger than the diameter of the handle 42.

Figure 14:
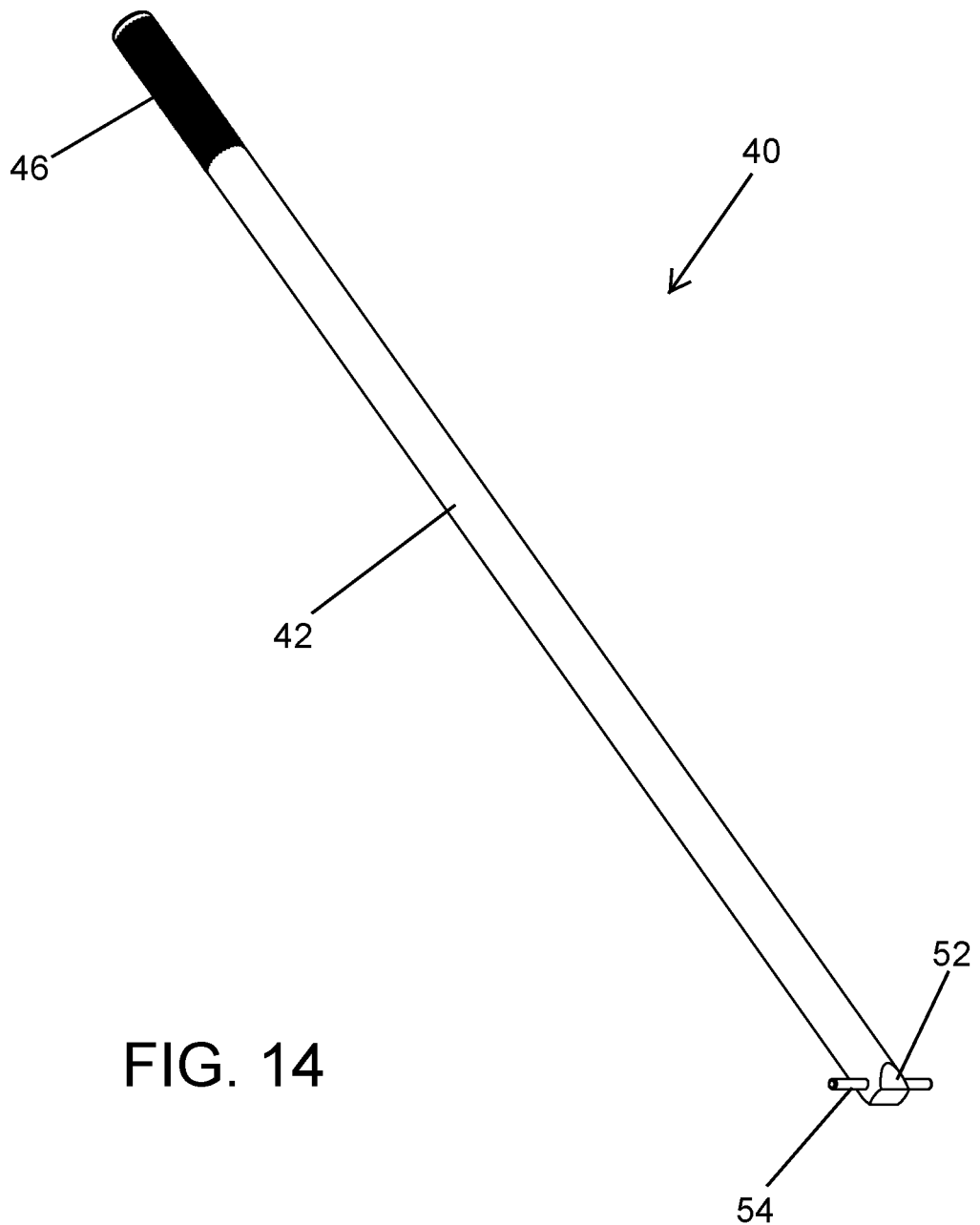
FIG. 14 is a front top perspective view of the tool in accordance with an embodiment of the invention.
Figure 15:
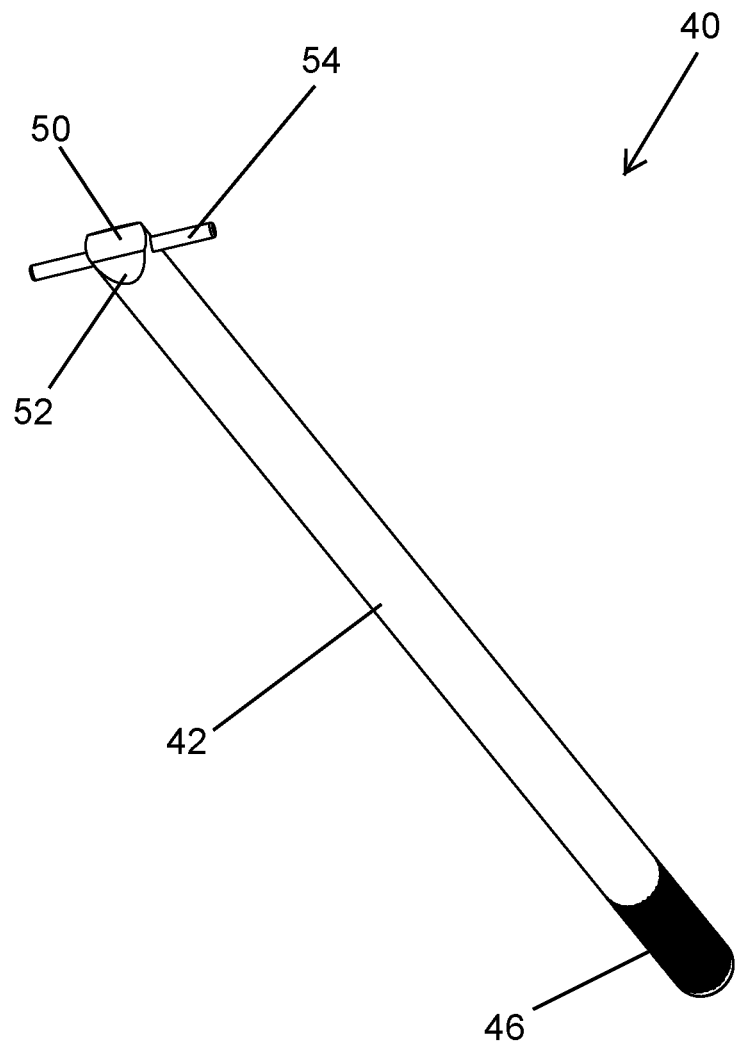
FIG. 15 is a bottom back perspective view of the tool in accordance with an embodiment of the invention.
Figure 16:
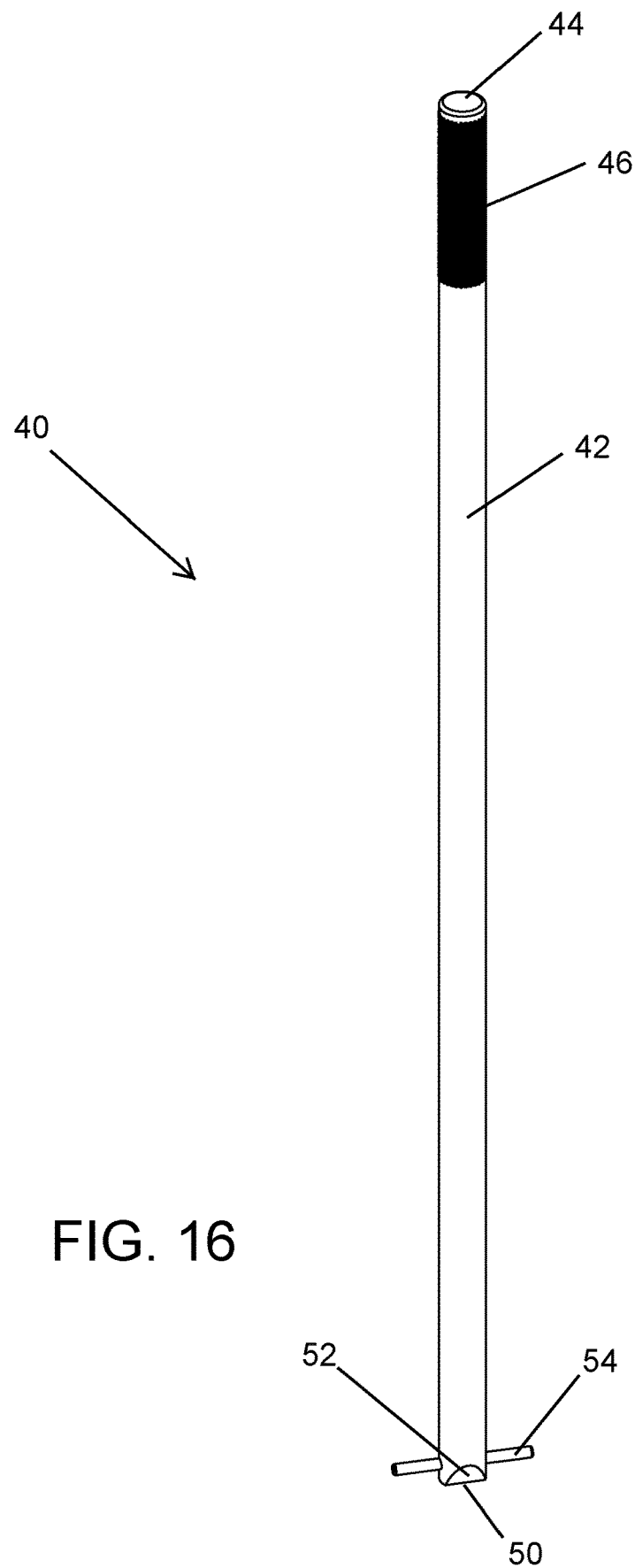
FIG. 16 is a front top perspective view of the tool in accordance with an embodiment of the invention.

FIGS. 14-16 illustrates the hand tool 40 of the hand truck tool system 10 in accordance with the invention. The tool 40 includes a longitudinal handle 42 having a first end 44 and second end 50. The first end 44 includes a grips 46 formed in the surface of the handle adjacent to the first end. The knurled or grip surface assists the user when twisting the handle or pushing/pulling on the handle. The second end 50 includes beveled segments along the edge of the free end. The bevels 52 make it easier to insert the second end into openings or between objects. Peg 54 extends from the handle adjacent the second end 50. The pegs assist the user in hooking an edge of a parcel while limiting damage to an edge of the parcel 14.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A hand truck dolly tool apparatus, said apparatus comprising:
   a tool having a handle, wherein the handle has a first end that includes a gripping surface formed adjacent the first end and having a second end that includes bevels formed along edge segments of the second end;
   pegs extending from opposing sides of the handle of the tool, wherein the pegs extend adjacent the second end of the handle.

2. The apparatus as recited in claim 1, further including a clip that engages around the handle and is attachable to a frame of the hand truck dolly.

3. The apparatus as recited in claim 1, further including socket retention member adapted for receiving the pegs and second end of the handle and wherein the socket retention member is attachable to a lower frame portion of the hand truck dolly.

4. The apparatus as recited in claim 1, wherein a length of the handle is at least two feet.

5. A hand truck dolly system, said system comprising:
   A hand truck dolly having an upright frame, wheels attached to the frame and a platform extending outward from a bottom portion of the frame;
   a tool having a handle, wherein the handle has a first end that includes a gripping surface formed adjacent the first end and having a second end that includes bevels formed along edge segments of the second end;
   pegs extending from opposing sides of the handle of the tool, wherein the pegs extend adjacent the second end of the handle;
   a clip that engages around the handle and is attachable to a frame of the hand truck dolly; and
   a socket retention member adapted for receiving the pegs and second end of the handle and wherein the socket retention member is further attachable to a lower frame portion of the hand truck dolly.

6. The system as recited in claim 5, wherein a length of the handle is at least two feet.

7. A method for moving and transporting parcels, the method including the steps of:
   selecting a parcel to be moved;
   acquire a hand truck system that includes,
      a hand truck dolly having a frame, wheels attached to the frame and a platform extending outward from a portion of the frame;

a tool having a handle, wherein the handle has a first end that includes a gripping surface formed adjacent the first end and having a second end that includes bevels formed along edge segments of the second end;

pegs extending from opposing sides of the handle of the tool, wherein the pegs extend adjacent the second end of the handle;

a clip that engages around the handle and is attachable to the frame of the hand truck dolly; and a socket retention member adapted for receiving the pegs and second end of the handle and wherein the socket retention member is further attachable to the frame;

engaging or disengaging the tool and the hand truck dolly;

manipulating the parcel with the second end of the tool to move the parcel onto or off of the platform of the hand truck dolly.

8. The method as recited in claim 7, further including the step of engaging the parcel with the tool as the hand truck dolly is moved.

9. The method as recited in claim 7, further including the step of engaging the parcel with the tool to enable a user to pull the parcel towards the frame of the hand truck dolly.

10. The method as recited in claim 7, further including the step of engaging the parcel with the tool to enable a user to push the parcel away from the frame of the hand truck dolly.

11. The method as recited in claim 7, further including the step of engaging the parcel with the tool to enable a user to pry the parcel away from the frame of the hand truck dolly.

12. The method as recited in claim 7, further including the step of engaging an axle of the hand truck dolly with the tool to enable a user to pull the hand truck dolly away from the parcel.

\* \* \* \* \*